United States Patent [19]

Otsuka et al.

[11] Patent Number: 5,496,393
[45] Date of Patent: Mar. 5, 1996

[54] GAS PURIFICATION CAPABILITY MEASURING METHOD FOR GAS PURIFICATION APPARATUS AND GAS PURIFICATION APPARATUS

[75] Inventors: Kenichi Otsuka, Kawasaki; Kazuya Mori, Yokohama, both of Japan

[73] Assignee: Kabushiki Kaisha Toshiba, Kawasaki, Japan

[21] Appl. No.: 441,114

[22] Filed: May 15, 1995

Related U.S. Application Data

[63] Continuation of Ser. No. 314,446, Sep. 28, 1994, abandoned, which is a continuation of Ser. No. 889,396, May 28, 1992, abandoned.

[30] Foreign Application Priority Data

May 31, 1991 [JP] Japan ................................ 3-157585

[51] Int. Cl.$^6$ .......................... B01D 46/46; B01D 53/04
[52] U.S. Cl. .................... 95/19; 55/274; 96/113; 422/119
[58] Field of Search ............... 55/270, 274; 96/113; 422/83, 88, 92, 118, 119, 122; 73/31.04, 31.02, 31.05, 31.03, 38, 40, 1 G, 1 R, 3; 95/19, 20, 21, 23, 25

[56] References Cited

U.S. PATENT DOCUMENTS

| | | | |
|---|---|---|---|
| 4,324,568 | 4/1982 | Wilcox et al. ................. | 55/270 X |
| 4,986,836 | 1/1991 | Tandon ......................... | 55/270 X |
| 5,109,716 | 5/1992 | Ito et al. ...................... | 73/38 X |
| 5,150,604 | 9/1992 | Succi et al. ................... | 73/31.04 X |

Primary Examiner—Robert J. Warden
Assistant Examiner—E. Leigh Dawson
Attorney, Agent, or Firm—Finnegan, Henderson, Farabow, Garrett & Dunner

[57] ABSTRACT

A gas purification apparatus has two gas purification units which are alternately operated. A gas purification capacity measuring means includes a means including valves for separating a target gas purification unit from a line, an evacuating means for evacuating the separated gas purification unit at a high vacuum, a means including a supply tank for supplying a predetermined very small amount of an impurity gas to an inlet of the high-vacuum separated gas purification unit, an auxiliary tank (e.g., a pressure reduction tank, a metering tank, and a pressure reduction valve), and a vacuum gauge for measuring a change in pressure at the outlet upon supply of the impurity gas to the inlet. In the gas purification apparatus having gas purification units each incorporating a getter material, the gas purification capacity of each gas purification unit can be more accurately and easily measured.

23 Claims, 5 Drawing Sheets

1

GAS PURIFICATION CAPABILITY MEASURING METHOD FOR GAS PURIFICATION APPARATUS AND GAS PURIFICATION APPARATUS

This application is a continuation of application Ser. No. 08/314,446, filed Sep. 28, 1994, now abandoned; which is a continuation of application Ser. No. 07/889,396, filed May 28, 1992, now abandoned.

BACKGROUND OF THE INVENTION

1. Field of the Invention

The present invention relates to a gas purification capability measuring method for a gas purification apparatus of a getter system used in the manufacture of semiconductor devices and the like, and the gas purification apparatus.

2. Description of the Related Art

Gases used in the manufacture of semiconductor devices and the like must have higher purities than those used in general industrial applications. A gas purification apparatus is generally arranged in a gas line, and its gas purification capability is managed. In particular, for example, since the purity of argon (Ar) gas generally used as a line gas in a sputtering technique greatly influences reliability of resultant metal wiring layers, an Ar gas purification apparatus is generally used. According to a conventional method of monitoring the purification capability of this Ar gas purification apparatus, a sampling technique is used. In this sampling technique, purified Ar gas is sampled in a gas container. An analyzing means such as a gas chromatograph is used to detect a trace amount of an impurity. According to this sampling technique, however, a long period of time and high cost are required. For example, it takes a day to sample the gas and a week to analyze the sampled gas. It is difficult to periodically evaluate the gas. As a result, the gas purification apparatus is replaced with a new one in accordance with the due recommended by a gas purification apparatus manufacturer.

FIG. 1 is a schematic system diagram of a conventional gas purification apparatus and a vacuum apparatus associated therewith. More specifically, FIG. 1 shows a method of easily evaluating the purification capability of a gas purification apparatus for Ar gas or the like within a short period of time and an evaluation apparatus therefor so as to solve the conventional problem described above (Published Unexamined Japanese Patent Application No. 1-215343). The gas purification capability of the gas purification apparatus is defined as a capability of a gas purification unit for removing impurity gases such as $N_2$ and $O_2$ contained in a line gas such as Ar gas. The gas purification capability is represented by the ratio of a total amount of unremoved impurity gases to the amount of Ar gas at the outlet of the gas purification unit. The line gas such as Ar gas supplied from a container or the like through a main pipe 1 is supplied to a gas purification unit 2. The gas purification unit 2 incorporates a getter material, absorbs the impurity gases contained in the supplied Ar gas, and purifies the Ar gas. The purified Ar gas is supplied to a process chamber 3 in a sputtering apparatus. A valve 4 is arranged midway along the main pipe 1 connected to the inlet of the gas purification unit 2. A valve 5 and a flow controller 6 are arranged between the outlet of the gas purification unit 2 and the process chamber 3. A discharge pipe 7 of the process chamber 3 is connected to a vacuum pump 9 through a valve 8. An auxiliary piping system 10 is branched from the main pipe 1 at the outlet of the gas purification unit 2. An impurity gas supply tank 11, an auxiliary vacuum pump 12, a vacuum gauge 13, and valves 14, 15, and 16 are arranged midway along the auxiliary piping system 10. A vacuum gauge 17 is arranged at the outlet of the gas purification unit 2.

The gas purification capability of the gas purification unit 2 is monitored in accordance with the following procedures. First, the valves 4 and 5 of the main pipe 1 are closed, the valves 14 and 16 of the auxiliary piping system 10 are opened, and the valve 15 is closed. The auxiliary vacuum pump 12 is actuated to evacuate the gas purification unit 2, the impurity gas supply tank 11, and the auxiliary piping system 10, so that the internal pressure thereof is set to be about $1\times10^{-1}$ to $1\times10^{-3}$ Pa. The valves 14 and 16 are closed and the valve 15 is opened to supply an impurity gas such as $N_2$ and $O_2$ gases to the tank 11, and the pressure of the impurity gas inside the tank 11 is set to be about 100 to 1 Pa. The valve 15 is closed to seal the impurity gas in the tank 11, and then the valve 14 is opened. When the valve 14 is opened, the impurity gas in the tank 11 flows toward the gas purification unit 2 to temporarily increase the pressure at the outlet of the gas purification unit 2. In this case, the impurity gas is absorbed by the getter material, and the above internal pressure is immediately reduced. An absorb rate is obtained from the degree of decrease in this internal pressure, thereby monitoring the gas purification capability of the gas purification unit. This method can easily monitor the gas purification capability of the gas purification unit 2 within a short period of time as compared with the conventional method of sampling the Ar gas in a container and analyzing it.

According to the gas purification capability monitoring method by which the gas purification capability of a gas purification apparatus is represented by the concentration of the residual impurities contained in the purified gas at the outlet, it is difficult to detect degradation of the gas purification capability, i.e., the degradation of the getter material until the impurity concentration of the Ar gas at the outlet of the gas purification unit 2 reaches several hundreds of ppb since the pressure of the impurity gas is masked by the pressure of the line gas. In other words, it is difficult to detect degradation of the gas purification capability when the Ar gas has a high purity, an impurity of concentration of several hundreds of ppb or less. For this reason, the gas purification unit may be kept used while its gas purification capability is kept degraded. Since gases used in the manufacture of semiconductor devices are particularly required to have a higher purity in future applications, a simple method capable of monitoring a very low impurity concentration of about 10 ppb at the outlet of the gas purification unit must be required. As can be apparent from FIG. 1, since this gas purification apparatus has only one gas purification unit 2, it takes about 10 hours to cool the gas purification unit 2, evacuate the gas purification unit 2, and measure the impurity concentration so as to measure and evaluate the gas purification capability. During this period, gas supply to the gas purification unit must be interrupted. In this gas purification apparatus, a predetermined amount of an impurity gas must be supplied to the impurity gas supply tank 11 for every measurement of the gas purification capability. It therefore takes a long period of time to measure the impurity gas concentration. As a result, this method is not suitable for repeating the measurements.

SUMMARY OF THE INVENTION

It is an object of the present invention to eliminate the drawbacks of the conventional techniques described above, and to provide a gas purification capability measuring method capable of more accurately and easily monitoring the gas purification capability of a gas purification apparatus, and the gas purification apparatus.

According to an aspect of the present invention, there is provided a gas purification capability measuring method for a gas purification apparatus, comprising the steps of: evacuating an interior of a gas purification system incorporating a getter material and having a gas purification unit for purifying a line gas to a predetermined degree of vacuum; supplying a predetermined amount of an impurity gas from an inlet of the gas purification unit to the gas purification system; adjusting to uniform a pressure of the impurity gas in the gas purification system upon a lapse of a predetermined period of time after the predetermined amount of the impurity gas is supplied; and measuring the pressure of the impurity gas at an outlet of the gas purification unit in the gas purification system to determine a gas purification capability of the gas purification unit.

According to another aspect of the present invention, there is also provided a gas purification apparatus comprising: a plurality of gas purification systems, each incorporating a getter material and having a gas purification unit, for independently purifying a line gas; means for separating a given gas purification system of the plurality of gas purification systems which is subjected to a measurement of a gas purification capability from remaining operating gas purification systems of the plurality of gas purification systems, and connecting the given gas purification system to an impurity gas supply system; means for evacuating each given gas purification system to a predetermined degree of vacuum; an impurity gas supply system for supplying a predetermined amount of an impurity gas to an inlet of the gas purification unit of each given gas purification system; and means, arranged at outlets of the gas purification units, for determining a gas purification capability of each given gas purification system.

In measurement of the gas purification capability of the gas purification apparatus according to the present invention, a small amount of an impurity gas is supplied from the inlet of each gas purification unit to detect degradation of the gas purification capability in accordance with a change in pressure at the outlet. If the gas purification capability of the gas purification unit is normal, the impurity gas supplied to the inlet is discharged by the gas purification unit and does not substantially appear at the outlet. The reading at the vacuum gauge at the outlet therefore does not change. To the contrary, when the gas purification capability is degraded, a nondischarged portion of the impurity gas flows to the outlet to change the pressure at this outlet. According to this apparatus and the measuring method thereof, even if the gas purification capability is about 10 ppb, degradation of the getter material can be determined. By this simple measuring means, the getter material can be replaced with a new one even when the impurity gas concentration is 1/10 that in the conventional technique. That is, a gas having a higher purity can be supplied.

Since the conventional gas purification apparatus comprises only one gas purification unit, gas supply must be interrupted for about 10 hours during measurement of the gas purification capability. Since the gas purification apparatus of the present invention, however, has two gas purification units or more, they can be selectively used to continuously supply the purified gas even during measurement of the gas purification capability and replacement of a gas purification unit.

In a gas purification apparatus according to the first embodiment of the present invention, an impurity gas supply auxiliary tank is arranged to have a volume about 1,000 to 10,000 times that of the impurity gas supply tank. For this reason, repeated measurements of the gas purification capability can be facilitated.

In a gas purification apparatus according to the second embodiment of the present invention, a tank obtained by connecting a pressure reduction tank and an impurity gas metering tank through a valve is used as the impurity gas supply auxiliary tank. During measurement of the gas purification capability, a predetermined amount of an impurity gas is supplied to the metering tank through the pressure reduction valve. The pressure of the impurity gas is reduced by the pressure reduction tank to a predetermined pressure, and the resultant impurity gas is supplied to the impurity gas supply tank. For this reason, the impurity gas supply tank can store a predetermined small amount of the impurity gas required for one measurement of the gas purification capability. In this manner, a small amount of an impurity gas can be supplied by opening/closing of the valve with good reproducibility, thereby allowing automatic measurements.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Gas purification capability measuring methods for a gas purification apparatus, and gas purification apparatuses according to embodiments of the present invention will be described in detail with reference to the accompanying drawings.

Figure 2:
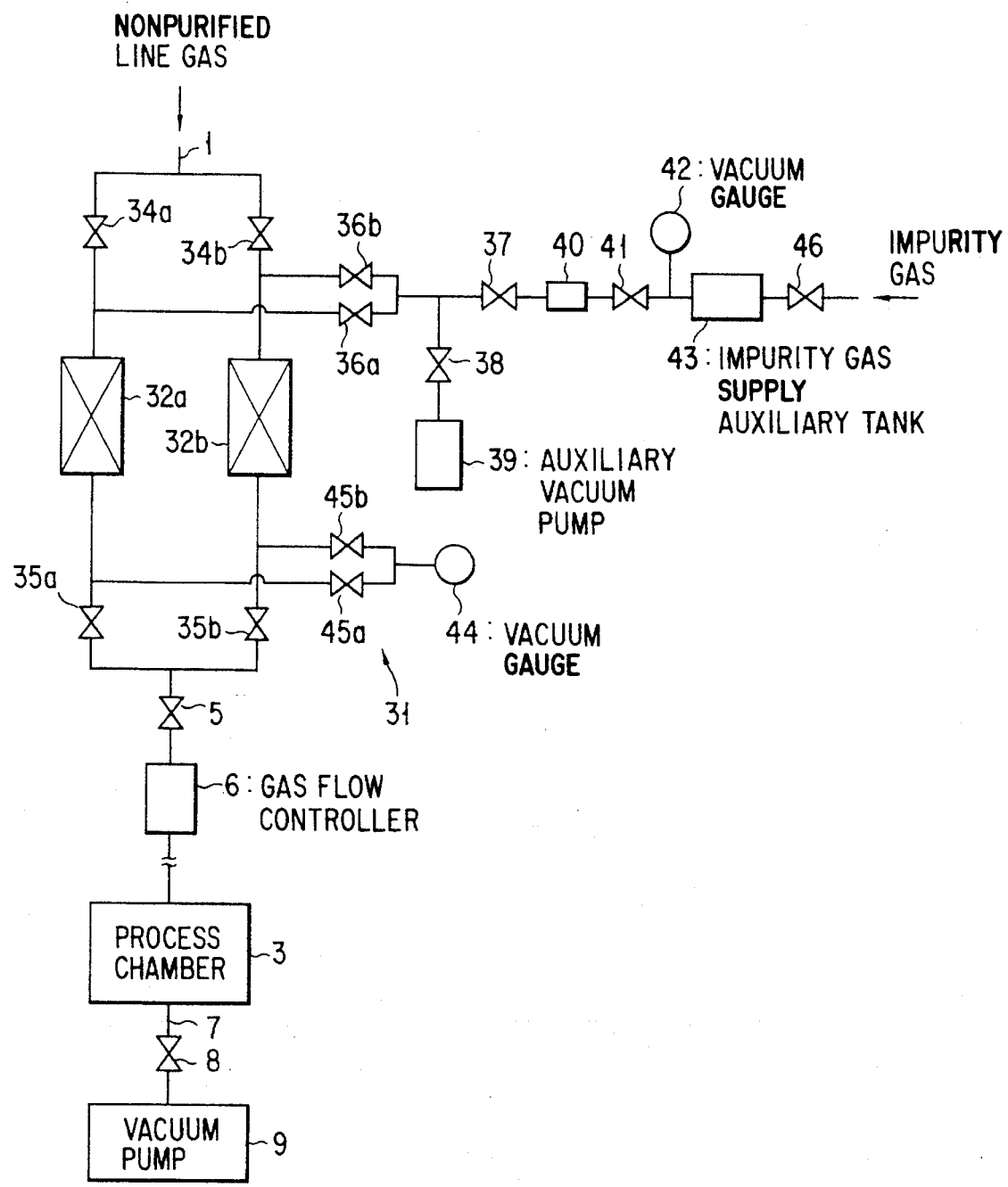
FIG. 2 is a schematic system diagram of a gas purification apparatus and a vacuum apparatus associated therewith according to the first embodiment of the present invention.

FIG. 2 is a schematic system diagram of a gas purification apparatus according to the first embodiment of the present inventions and a sputtering apparatus associated therewith.

Figure 1:
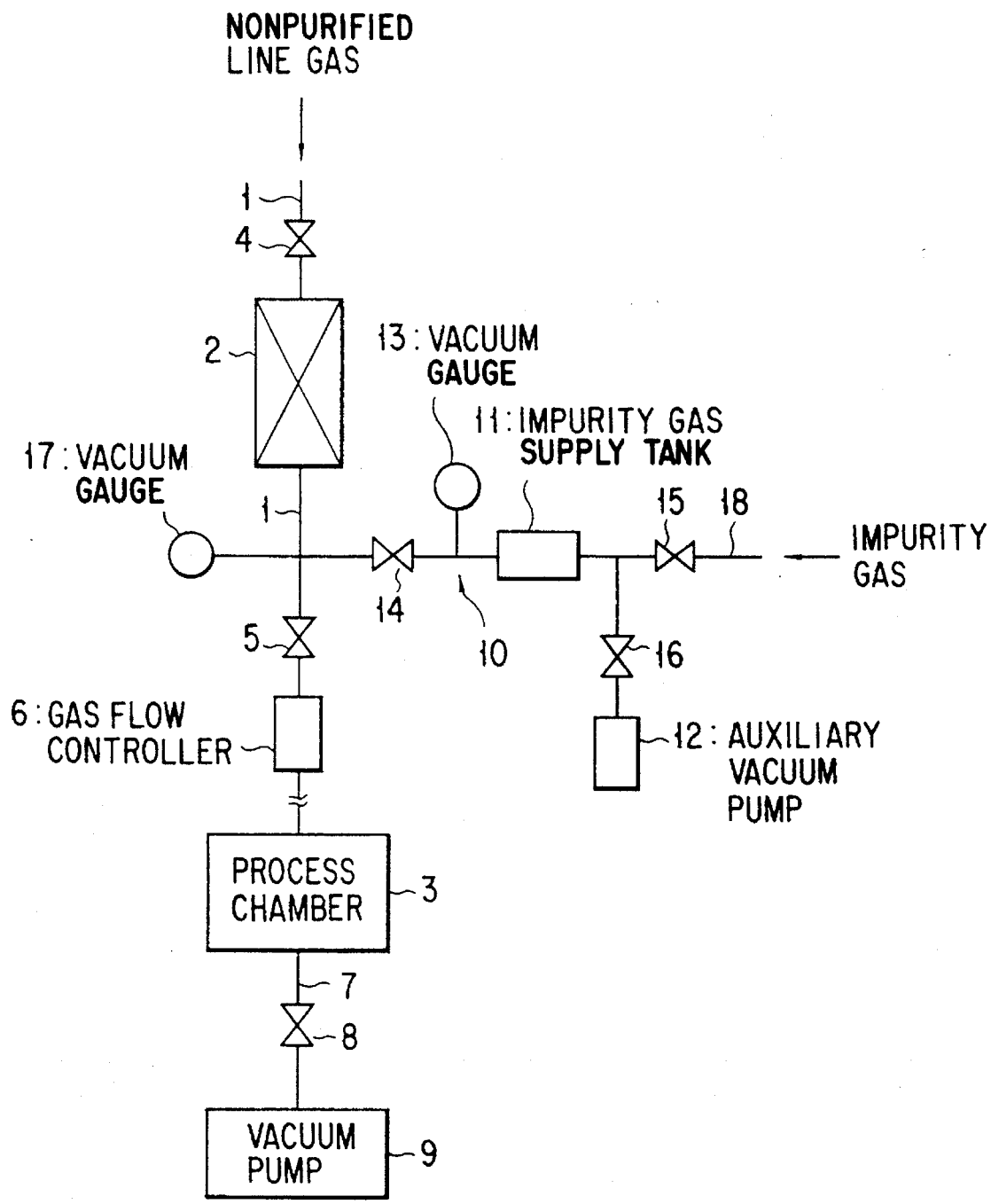
FIG. 1 is a schematic system diagram of a conventional gas purification apparatus and a vacuum apparatus associated therewith.

In the first embodiment, two gas purification units are arranged in parallel for the sake of simplicity. A plurality of gas purification units can be arranged in parallel in the present invention. Even during operation of one gas purification unit, measurement of the gas purification capability can be performed in the other gas purification unit. A line gas such as Ar gas from a container or the like flows through a main pipe 1 and is branched into two systems. Each branched gas flow is supplied to the inlet of a gas purification unit 32a or 32b through a valve 34a or 34b. Each of the gas purification units 32a and 32b incorporates a getter material containing as a major constituent an alloy of, e.g., zirconium (Zr), iron (Fe), and vanadium (V). Impurity gases contained in the Ar gas supplied to the gas purification unit 32a or 32b are removed by the incorporated getter material. The purified Ar gas is supplied from the outlet of the gas purification unit 32a or 32b to a process chamber 3 through a valve 35a or 35b. The same reference numerals as in FIG. 1 denote the same parts in FIG. 2, and a detailed description thereof will be omitted. Unlike in the conventional example, in the first embodiment, an impurity gas supply tank 40 which communicates with the inlets of the gas purification units 32a and 32b through an auxiliary piping system 30, and an impurity gas supply auxiliary tank 43 for supplying the impurity gas to the tank 40 are arranged. The volumes of the impurity gas supply tank 40 and the impurity gas supply auxiliary tank 43 are set to be 2 cc and 1,000 cc, respectively, for example. The impurity gas supply auxiliary tank 43 is arranged so that its volume is set to be large to facilitate pressure adjustment and to repeat measurements by single pressure adjustment. Reference numerals 36a, 36b, 37, 38, 41, and 46 denote valves for opening/closing the flow paths; and 42, a vacuum gauge such as a Pirani gauge. An auxiliary vacuum pump 39 is provided between gas purification systems and an impurity gas supply system, described later, to make the interior of the gas purification system vacuous. A vacuum gauge, e.g., ionization vacuum gauge 44 which communicates with the outlets of the gas purification units 32a and 32b through an auxiliary piping system 31 is arranged through valves 45a and 45b. The amount of an impurity gas in the impurity gas supply tank 40 is set not to greatly degrade the getter material when the impurity gas is supplied from the tank 40 to the gas purification unit 32a. Since the getter material has an absorption capability of about several tens of cc of an impurity gas per gram of the getter material, the amount of the impurity gas must be preferably set to be the above amount or less. Note that the amount of the impurity gas must be set to be an amount corresponding to the detection range of a change in pressure measured by the vacuum gauge 44 when the getter material is degraded. For example, the above condition is satisfied when the amount of the impurity gas is about $10^{-4}$ cc per gram of the getter material when the gas purification unit 32a is used, the valves 34a and 35a and valves 5 and 8 are opened, and the remaining valves are kept closed. When the gas purification unit 32b is used, the valves 34b, 35b, 5, and 8 are opened, and the remaining valves are kept closed. Note that normally the gas purification units 32a and 32b are alternately used. A vacuum pump 9 is actuated to supply and purify the Ar gas through the gas purification unit 32a or 32b. The purified Ar gas is supplied to the process chamber 3. For the descriptive convenience, a system consisting of the gas purification unit 32a, the valves 34a, 35a, 36a, 45a, and pipes therebetween is called a "first gas purification system". A system consisting of the gas purification unit 32b, the valves 34b, 35b, 36b, 45b, and pipes therebetween is called a "second gas purification system". A piping system consisting of the gas purification supply tank 40, the impurity gas supply auxiliary tank 43, the valves 43, 37, 41, and 46, and pipes therebetween is called an "impurity gas supply system".

A gas purification capability measuring method using the gas purification apparatus of the first embodiment in FIG. 2 will be described below when the gas purification unit 32a is in use, the valves 34a and 35a are opened, and the valves 36a and 45a are closed. At this time, the valves 34b and 35b are kept open and the valves 36b and 45b are kept closed to continuously supply the Ar gas to the process chamber 3. The valves 38, 36a and 45a is opened while the valve 37 is kept closed, and the vacuum pump 39 is actuated to evacuate the first gas purification system including the gas purification unit 32a to set the reading of the vacuum gauge 44 to be, e.g., $1.0 \times 10^{-1}$ Pa or less. The valve 38 is then closed. While the valve 37 is kept closed, the valves 41 and 46 are opened to fill the impurity gas supply tank 40 and the impurity gas supply auxiliary tank 43, i.e., the impurity gas supply system with, e.g., $N_2$ gas when the valves 41 and 46 are then closed and the valve 37 is opened, the impurity gas is supplied to the inlet of the gas purification unit 32a through the open valve 36a. In the gas purification unit 32a, the impurity gas is removed by the getter material incorporated therein. That is, the impurity gas is discharged i.e., absorbed by the gas purification unit 32a. When the gas purification capability of the gas purification unit 32a is not degraded, the outlet of the vacuum gauge 44 at the gas purification unit 32a does not exhibit a change in pressure by the behavior of the getter material. In this state, the concentration of impurity gases contained in the Ar gas at the outlet during the operation of the apparatus is about 2 to 3 ppb or less, i.e., below the measurement limitation of the analyzing apparatus such as a gas chromatograph. To the contrary, when the gas purification capability of the gas purification unit is degraded, the vacuum gauge 44 exhibits an increase in pressure. That is, when the gas purification capability of the gas purification unit is degraded, the discharge of the impurity gas supplied from the inlet cannot be completed, and the nondischarged portion of the impurity gas partially flows out from the outlet.

The apparatus shown in FIG. 2 has the two gas purification units 32a and 32b which are alternately used, so that the purified gas can be constantly supplied to the process chamber 3 even during the measurement of the gas purification capability and during replacement of a gas purification unit. In addition, assuming that the volume of the impurity gas supply auxiliary tank 43 is set sufficiently larger than that of the impurity gas supply tank 40 by about 1,000 to 10,000 times, for example, once the pressure of the impurity gas supply auxiliary tank 43 is set to be a desired value, the impurity gas having a desired pressure can be supplied to the tank 40 upon opening/closing of the valve 41 without any subsequent adjustment. Therefore, the gas purification capability can be repeatedly and easily measured.

In the gas purification apparatus in FIG. 2 according to the first embodiment of the present invention, when the gas purification capability is to be measured for an impurity gas concentration of about 10 ppb at the outlet, a very small amount of an impurity gas must be accurately supplied to the gas purification unit. The very small amount of the impurity gas supplied to the inlet of the gas purification unit must be measured by trials and errors in consideration of practical conditions to be $10^{-4}$ cc per gram of the getter material at a room temperature and an atmospheric pressure, as described above. Since the amount of the getter material incorporated in each gas purification unit is about 200 g, the amount of the impurity gas supplied thereto is about $2\times10^{-2}$ cc at a room temperature and an atmospheric pressure. When this amount of the impurity gas, i.e., $2\times10^{-2}$ cc, is to be supplied to the gas purification unit, if the volume of the impurity gas supply tank is set to be $2\times10^{-2}$ cc, it is easy to supply the impurity gas since the impurity gas need only be sealed at the atmospheric pressure (1 atm). It is, however, impossible to obtain a tank having a volume of $2\times10^{-2}$ cc in practice.

With reference to FIG. 2, supply of an impurity gas having an amount of $2\times10^{-2}$ cc in the gas purification apparatus of the first embodiment will be described in more detail. In order to evacuate a portion from the valve 37 to the valve 46, the auxiliary vacuum pump 39 is actuated while the valves 36a, 36b and 45 are closed and the valves 37, 38, and 41, are opened thereby setting the pressure of the impurity gas supply system to be about $1\times10^{-1}$ Pa. When this pressure is obtained, the valve 37 is closed, and then the valve 46 is opened to supply an impurity gas from, e.g., an $N_2$ line to the tanks 40 and 43. Even if the valve 46 is immediately opened and closed, the pressure of the tank becomes about $10^4$ Pa. In this case, in order to seal an impurity gas having an amount of $2\times10^{-2}$ cc in the impurity gas supply tank 40, the internal pressure in the tank must be reduced to $10^3$ Pa. For this purpose, the valve 37 is controlled to adjust the pressure to $10^3$ Pa while the pressure is visually checked with the vacuum gauge 42. When the valve 41 is then closed, the impurity gas having the amount of $2\times10^{-2}$ cc can be sealed in the impurity gas supply tank 40.

Figure 3:
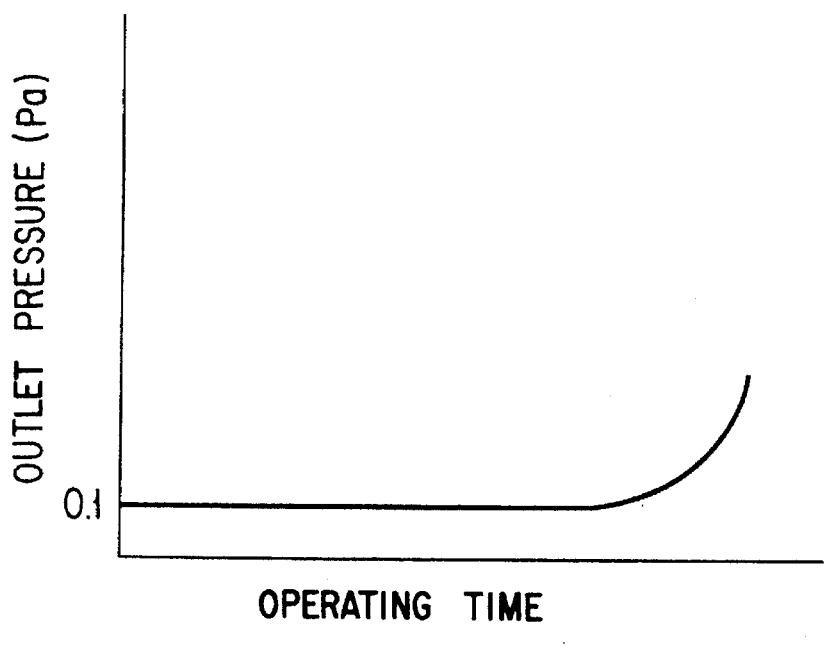
FIG. 3 is a graph showing a relationship between the operating time and the outlet pressure of the gas purification apparatus of FIG. 2.

FIG. 3 shows the long-term monitoring results of the gas purification capability of this gas purification apparatus according to this monitoring method. The operating time is plotted along the abscissa, and the outlet pressure (Pa) during monitoring is plotted along the ordinate. In the initial period of operations the outlet pressure does not change, and the impurity gas concentration is lower than the measuring limitation level (2 to 3 ppb) of the analyzing apparatus, and a large gas purification capability is maintained. However, the gas purification capability is degraded with a lapse of a long period of time.

Figure 4:
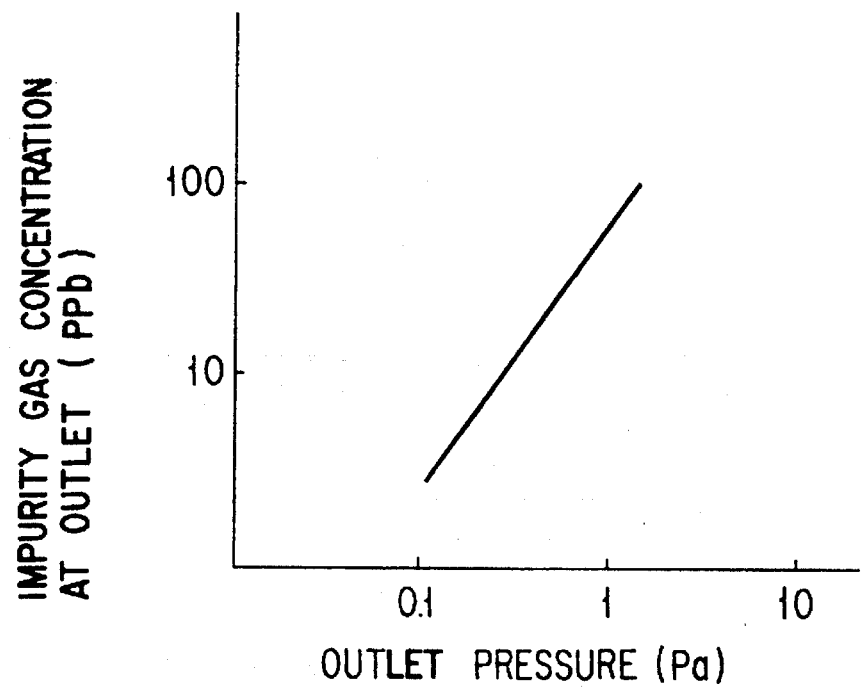
FIG. 4 is a graph showing a relationship between the outlet pressure and the outlet impurity gas concentration of the gas purification apparatus shown in FIG. 2.

FIG. 4 shows a correlation between the outlet pressure Pa obtained during measurement of the gas purification unit and plotted along the abscissa and the impurity gas concentration (ppb) of the Ar gas at the outlet. A relatively good correlation can be obtained. As can be apparent from FIGS. 3 and 4, the gas purification capability of the gas purification apparatus can be determined even when the impurity gas concentration at the outlet is about 10 ppb.

However, the drawbacks posed by the gas purification apparatus according to the first embodiment of the present invention are use of an expensive vacuum gauge at the impurity gas supply auxiliary tank 43, and need for fine control of the valve 37 upon adjustment of the pressure inside the tank. For these reasons, skills are required to operate the gas purification apparatus of the first embodiment. The operation is time-consuming and cannot be easily automated. When the apparatus is repeatedly used without performing additional pressure adjustment after the pressure adjustment is performed once, the volume of the impurity gas supply auxiliary tank 43 must be at least 1,000 times that of the impurity gas supply tank 40. When an impurity gas supply auxiliary tank 43 having a volume which is 1,000 times that of the impurity gas supply tank 40 is used, the gas purification apparatus becomes bulky, resulting in inconvenience.

Figure 5:
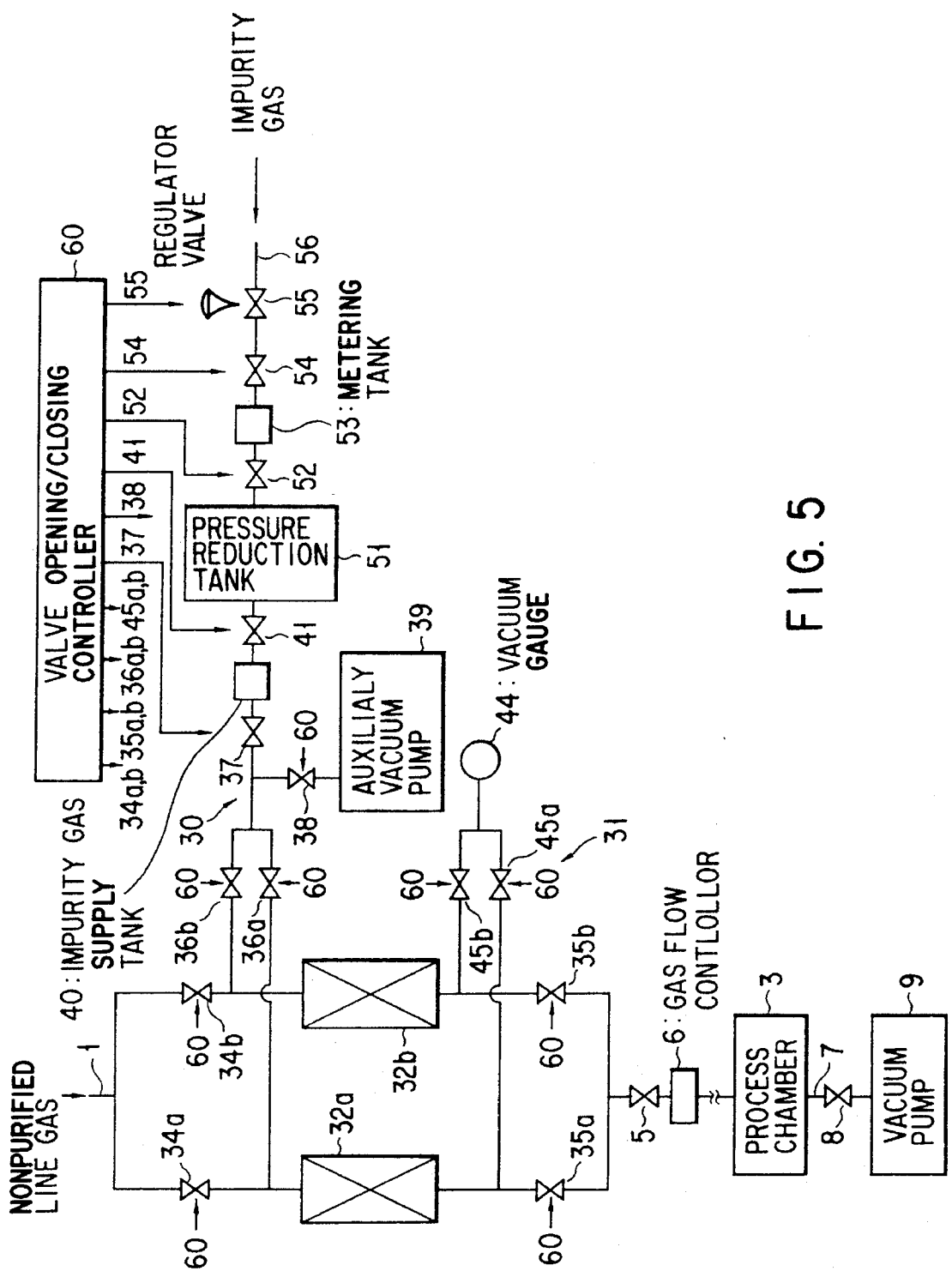
FIG. 5 is a schematic system diagram of a gas purification apparatus and a vacuum apparatus associated therewith according to the second embodiment of the present invention.

FIG. 5 is a schematic system diagram of a gas purification apparatus according to the second embodiment of the present invention and a sputtering apparatus associated therewith. The same reference numerals as in FIGS. 1 and 2 denote the same parts in FIG. 5. The gas purification apparatus of the second embodiment of the present invention is obtained by eliminating the above drawbacks of the gas purification apparatus of the first embodiment. That is, a very small amount of an impurity gas can be more accurately and easily supplied during measurement of the gas purification capability. As shown in FIG. 5, the gas purification apparatus of the second embodiment is substantially the same as that of the first embodiment in that first and second gas purification systems are parallel to each other and are connected to a process chamber 3 in the same manner as in the first embodiment, and that an auxiliary vacuum pump 39 is provided between the gas purification systems and the impurity gas supply system. However, in the second embodiment, in the impurity gas supply system, a pressure reduction tank 51 and an impurity metering tank 53 are connected in series with an impurity gas supply tank 40 through, respectively, valves 41 and 52. An impurity gas supply line 56 is connected to the metering tank 53 through a valve 54 and a pressure reduction valve 55. The volumes of the impurity gas supply tank 40, the pressure reduction tank 51, and the impurity gas metering tank 53 are set to be 2 cc, 94 cc, and 1 cc, respectively. Since the volume of the impurity gas supply tank 40 is 2 cc, when the impurity gas e.g., $N_2$ gas is sealed at the pressure of $10^3$ Pa described above in the tank 40, a required amount of the impurity $2\times10^{-2}$ cc at a room temperature and an atmospheric pressure is obtained. At this time, factors for determining the amount of the impurity gas are the ratio of the total volume of the impurity gas supply tank 40, the pressure reduction tank 51, and the metering tank 53 to the volume of the metering tank 53, and the pressure of the impurity gas sealed in the metering tank 53, i.e., the secondary pressure of the pressure reduction valve 55. When the secondary pressure of the pressure reduction valve 55 is set to be 1.0 kgf/cm$^2$, the pressure of the impurity gas supply tank 40 is set to be $10^3$ Pa. Therefore, an impurity gas having an amount of $2\times10^{-2}$ cc required during measurement of the gas purification capacity of the gas purification apparatus can be obtained.

Figure 6:
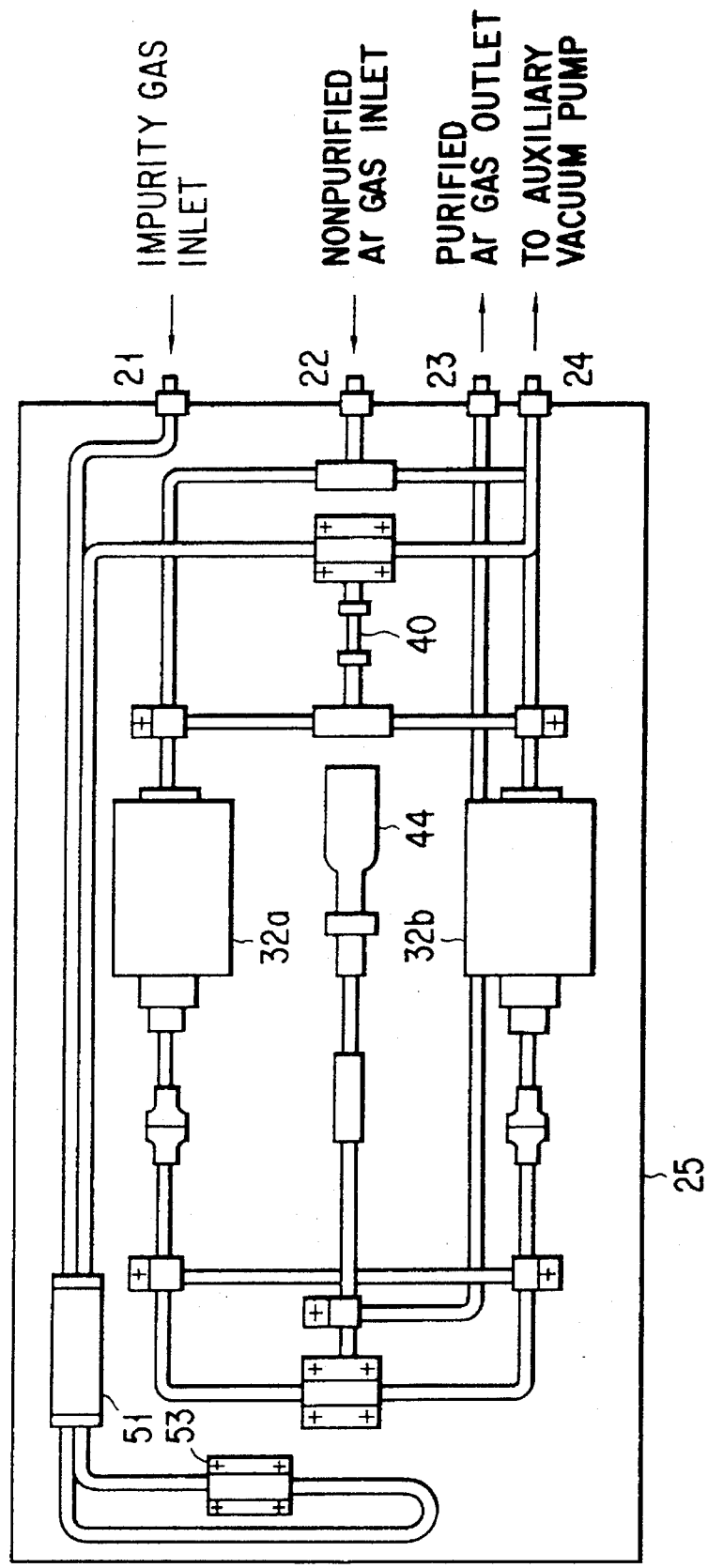
FIG. 6 is a plan view showing the layout of constituting members of the gas purification apparatus shown in FIG. 5.

FIG. 6 shows the layout of the constituting members of the above gas purification apparatus stored in a housing 25. A terminal 21 serves as an impurity gas inlet, e.g., $N_2$ gas inlet connected to the impurity gas supply line through a pressure reduction valve. A terminal 22 serves as a nonpurified Ar gas inlet connected to a main pipe. A terminal 23 serves as a purified Ar gas outlet. A terminal 24 is connected to an auxiliary vacuum pump arranged outside the housing 25.

A gas purification capability measuring method according to the second embodiment in FIG. 5 will be described below. In order to measure the gas purification capability of a gas purification unit 32a, valves 36a, 45a, 37, 38, 41, and 52 are opened, and valves 34a, 35a, 36b, 45b, and 54 are closed. The auxiliary vacuum pump 39 is actuated to evacuate the first gas purification system including the gas purification unit 32a, and the impurity gas supply system including the impurity gas supply tank 40, the pressure reduction tank 51, and the metering tank 53 to a pressure of about $10^{-1}$ Pa. The corresponding pressure is read at a vacuum gauge 44. The valves 37, 41, and 52 are closed. After the pressure reduction valve 55 is set to be 1 kgf/cm$^2$, the valve 54 is opened to supply the impurity gas to the metering tank 53. After the pressure of the impurity gas is uniformed, the valve 54 is closed. By opening the valves 41 and 52, the gas sealed in the metering tank 53 is supplied to the impurity gas supply tank 40 and the pressure reduction tank 51 which are set at a predetermined pressure lower than that of the metering tank 53, so that the pressure of the system from the valve 37 to the valve 54 of the impurity gas supply system can be set to be $10^3$ Pa. The valves 41 and 52 are closed to seal the impurity gas having an amount of $2 \times 10^{-2}$ cc in the impurity gas supply tank 40. The valve 37 is opened to supply the impurity gas having an amount of $2 \times 10^{-2}$ cc (1 atm) to the inlet of the gas purification unit 32a. At the same time, a change in pressure at the outlet is measured by the vacuum gauge 44, thereby evaluating the gas purification capability of the gas purification unit 32a. Opening/closing operations of the valves in the second embodiment can be automatically and quickly controlled in accordance with preset sequences by a valve opening/closing controller 60.

In the above gas purification apparatus, a small amount of an impurity gas can be supplied with good reproducibility within a short period of time by only opening/closing operations of the valves during measurement of the gas purification capability. At the same time, the measurement can be easily automated. Unlike the gas purification apparatus of the first embodiment, skilled operations for finely controlling the valves with pressures being checked need not be performed, and repeated measurements can be facilitated. In addition, the volume of the impurity gas supply auxiliary tank need not be 1,000 times or more that of the impurity gas supply tank. Although an expensive vacuum gauge must be arranged at the impurity gas supply auxiliary tank in the gas purification apparatus of the first embodiment, it can be omitted in the gas purification apparatus of the second embodiment.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A gas purification capability measuring method for a gas purification apparatus having a gas purification system including a gas purification unit for purifying a gas line in which a getter material is incorporated, comprising the steps of:

providing a gas purification system and gas purification unit in which a getter material is incorporated and supplying an amount of a line gas to said system;

stopping said supplying of said line gas to said system;

evacuating an interior of said gas purification system to a predetermined degree of vacuum sufficient for enabling detection of degradation of a gas purification capability of said gas purification unit;

supplying a selected amount of an impurity gas from an inlet of said gas purification unit through said getter material and into said gas purification system to flow said impurity gas in the same direction as that of the line gas, said selected amount being relatively smaller and at a relatively lower pressure than said amount of said line gas;

allowing said getter material to absorb said impurity gas in said gas purification system during a predetermined period of time after said impurity gas is supplied; and measuring at an outlet of said gas purification unit in said gas purification system only a pressure of the impurity gas that is not absorbed by said getter material to monitor a gas purification capability of said gas purification unit while a plurality of said gas purification systems are in operation, except for said gas purification system being measured.

2. A method according to claim 1, wherein the evacuating step comprises the step of causing a vacuum pump to independently evacuate two gas purification units to the predetermined degree of vacuum.

3. A method according to claim 2, wherein the evacuating step comprises the step of evacuating one of two gas purification systems while the other of said two gas purification units is in operation.

4. A method according to claim 2, wherein the predetermined degree of vacuum is not more than $1.0 \times 10^{-1}$ pa.

5. A method according to claim 1, wherein the supplying step comprises the step of supplying an impurity gas having a first predetermined pressure and in a first tank having a first predetermined volume and positioned in an impurity supply system to said gas purification system.

6. A method according to claim 5, wherein the supplying step comprises the step of repeatedly supplying the impurity gas to said first tank from a second tank having a second predetermined volume larger than the first predetermined volume of said first tank positioned in said impurity supply system and filled with the impurity gas having the first predetermined pressure.

7. A method according to claim 6, wherein the second predetermined volume of said second tank is set to have a volume ratio of 1,000 times the first predetermined volume of said first tank.

8. A method according to claim 1, wherein the allowing step comprises the step of setting said predetermined period of time in accordance with an impurity absorption capability of said getter material.

9. A method according to claim 1, wherein the measuring step comprises the step of detecting a rate of decrease in pressure of the impurity gas at an outlet of said gas purification unit.

10. A method according to claim 9, wherein the measuring step comprises the step of determining a degree of degradation of said getter material of said gas purification unit on the basis of a detection result in the detecting step.

11. A method according to claim 9, further comprising the step of detecting the rate of decrease in pressure of the impurity gas using a vacuum gauge.

12. A method according to claim 1, wherein the supplying step comprises the step of supplying said selected amount of the impurity gas determined in accordance with a volume ratio of a total volume of third, fourth, and fifth tanks, each having a third, fourth and fifth predetermined volume, respectively, to a volume of said third tank, and a pressure of the impurity gas inside said third tank;

with said third, fourth and fifth tanks being positioned in series with an impurity gas supply system from which said impurity gas is supplied to said gas purification system.

13. A method according to claim 12, wherein the supplying step comprises the steps of: supplying the impurity gas at a second predetermined pressure to said third tank from an external impurity gas supply source, diffusing the impurity gas and uniforming a pressure thereof within a total volume of the third predetermined volume of said third tank, the fourth predetermined volume of said fourth tank, and the fifth predetermined volume of said fifth tank to obtain a third predetermined pressure; and supplying only the impurity gas having said fifth predetermined volume in said fifth tank to said gas purification system.

14. A gas purification apparatus comprising:

a plurality of gas purification systems, arranged in parallel and each having a gas purification unit in which a getter material is incorporated, for independently purifying a line gas;

means for separating a given gas purification system of said plurality of gas purification systems which is subjected to a measurement of a gas purification capability from remaining operating gas purification systems of said plurality of gas purification systems which are operating, and connecting said given gas purification system to an impurity gas supply system;

means for stopping supply of line gas to said given gas purification system to be measured;

means for evacuating each given gas purification system to a predetermined degree of vacuum;

an impurity gas supply system for supplying a selected amount of an impurity gas to an inlet of said gas purification unit of each given gas purification system to flow said impurity gas through said getter material in the same direction as that of a line gas, with said selected amount being relatively smaller and at a relatively lower pressure than said amount of said line gas; and means for measuring at outlets of said gas purification units only a pressure of said impurity gas which is not absorbed by said getter material to monitor a gas purification capability of each said gas purification system while said remaining gas purification systems are operating.

15. An apparatus according to claim 14, wherein said plurality of gas purification systems are independently positioned parallel to each other such that said given gas purification system can be subjected to a measurement of the gas purification capability while said remaining gas purification systems are in operation.

16. An apparatus according to claim 15, wherein each of said plurality of gas purification systems comprises: a gas purification unit for purifying the line gas; valves respectively positioned at an inlet and an outlet of said gas purification unit; valves respectively positioned between said gas purification unit and said valve at said inlet of said gas purification unit and between said gas purification unit and said impurity supply system; and valves arranged between said gas purification unit and said valve at said outlet of said gas purification unit and between said gas purification unit and said determining means.

17. An apparatus according to claim 14, wherein said evacuating means comprises a vacuum pump connected to said plurality of gas purification systems and said impurity gas supply system.

18. An apparatus according to claim 14, wherein said impurity gas supply system comprises: a first tank having a first predetermined volume; a second tank, having a second predetermined volume larger than the first predetermined volume, for supplying the impurity gas to said first tank; a vacuum gauge, positioned between said first tank and said second tank, for detecting a pressure of the impurity gas; and valves arranged at inlets and outlets of said first and second tanks.

19. An apparatus according to claim 18, wherein said impurity gas supply system further comprises a third tank having a volume necessary for supplying another predetermined amount of said impurity gas to said gas purification system and said first tank has a unit volume necessary for measuring a predetermined amount of said impurity gas of a first pressure, said second tank has a volume which provides said impurity gas of a second pressure when said impurity gas of said first pressure sealed in said first tank is spread into a total volume obtained by adding volumes of said first, second and third tanks due to a pressure difference.

20. An apparatus according to claim 14, wherein said determining means comprises degradation measuring means for measuring degradation of said getter material in accordance with a rate of decrease in pressure of the impurity gas at an outlet of said gas purification unit.

21. An apparatus according to claim 20, wherein said degradation measuring means comprises a vacuum gauge.

22. An apparatus according to claim 14, wherein said impurity gas supply system comprises: a pressure reduction valve for reducing a pressure of the impurity gas to be supplied to a first predetermined pressure; a third tank for metering only a third predetermined amount of the impurity gas having the first predetermined pressure and storing the third predetermined amount of the impurity gas; a fourth tank having a fourth predetermined volume required to reduce the pressure of the impurity gas to a second predetermined pressure required for measurement; a fifth tank, having a fifth predetermined volume for supplying the impurity gas having the second predetermined pressure in an amount required for one measurement, and valves positioned at inlets and outlets of said fourth tank and said fifth tanks.

23. An apparatus according to claim 14, further comprising a valve opening/closing controller for automatically controlling said valves of said separating means and said impurity gas supply system to cause said apparatus to perform predetermined operations.

* * * * *